(12) United States Patent
Dong et al.

(10) Patent No.: US 9,033,193 B2
(45) Date of Patent: May 19, 2015

(54) CONTAINER WITH FRANGIBLE DEVICE INTERFACE

(75) Inventors: XiaoYou Dong, GuangDong (CN);
ZhiHao Liang, Dongguan (CN);
XianZhi Zhou, Dongguan (CN)

(73) Assignee: RECKITT BENCKISER LLC, Parsippany, NJ (US)

( * ) Notice: Subject to any disclaimer, the term of this patent is extended or adjusted under 35 U.S.C. 154(b) by 228 days.

(21) Appl. No.: 13/880,658

(22) PCT Filed: Oct. 21, 2011

(86) PCT No.: PCT/GB2011/052045
§ 371 (c)(1),
(2), (4) Date: Apr. 19, 2013

(87) PCT Pub. No.: WO2012/056219
PCT Pub. Date: May 3, 2012

(65) Prior Publication Data
US 2013/0200073 A1 Aug. 8, 2013

(30) Foreign Application Priority Data
Oct. 26, 2010 (GB) .................................. 1018058.6

(51) Int. Cl.
*B65D 51/20* (2006.01)
*B65D 47/24* (2006.01)
*B65D 47/36* (2006.01)
*B23P 19/00* (2006.01)

(52) U.S. Cl.
CPC ........... *B65D 51/20* (2013.01); *Y10T 29/49815* (2015.01); *B65D 47/248* (2013.01); *B65D 47/36* (2013.01); *B23P 19/00* (2013.01)

(58) Field of Classification Search
CPC ........ B65D 51/20; B65D 51/22; B65D 47/36; B65D 47/248; B23P 19/00; Y10T 29/49815
USPC .................. 222/541.1, 541.6, 541.9, 325; 220/258.1–258.3, 258.5
See application file for complete search history.

(56) References Cited

U.S. PATENT DOCUMENTS

| 3,227,317 | A | * | 1/1966 | Bereziat et al. ................. 222/83 |
| 4,895,282 | A | * | 1/1990 | Robinson ...................... 222/482 |
| 2003/0071089 | A1 | | 4/2003 | Ma |

FOREIGN PATENT DOCUMENTS

| EP | 1260169 A2 | 11/2002 |
| FR | 2900909 A1 | 11/2007 |

(Continued)

OTHER PUBLICATIONS

The International Preliminary Report on Patentability dated May 10, 2013.

(Continued)

*Primary Examiner* — J. Casimer Jacyna
(74) *Attorney, Agent, or Firm* — Troutman Sanders LLP; Ryan A. Schnieder; Elizabeth-Ann Weeks

(57) ABSTRACT

Disclosed is an improved an improved cap (40) for a bottle (1) which comprises a frangible device interface (100) including a valve part (52) and a tethered pull-ring (70), which frangible device interface may be removed from the cap preferably after the contents of the bottle are exhausted.

5 Claims, 6 Drawing Sheets

(56) References Cited

FOREIGN PATENT DOCUMENTS

| GB | 2429452 A | 2/2007 |
| WO | 2010055309 A1 | 5/2010 |
| WO | 2010055313 A1 | 5/2010 |
| WO | 2010055314 A1 | 5/2010 |

OTHER PUBLICATIONS

International Search Report and Written Opinion mailed Jan. 12, 2011 for priority application PCT/GB2011/052045.
Combined Search and Examination Report under Sections 17 and 18(3) mailed Feb. 8, 2011 for priority application GB 1018058.6.

* cited by examiner

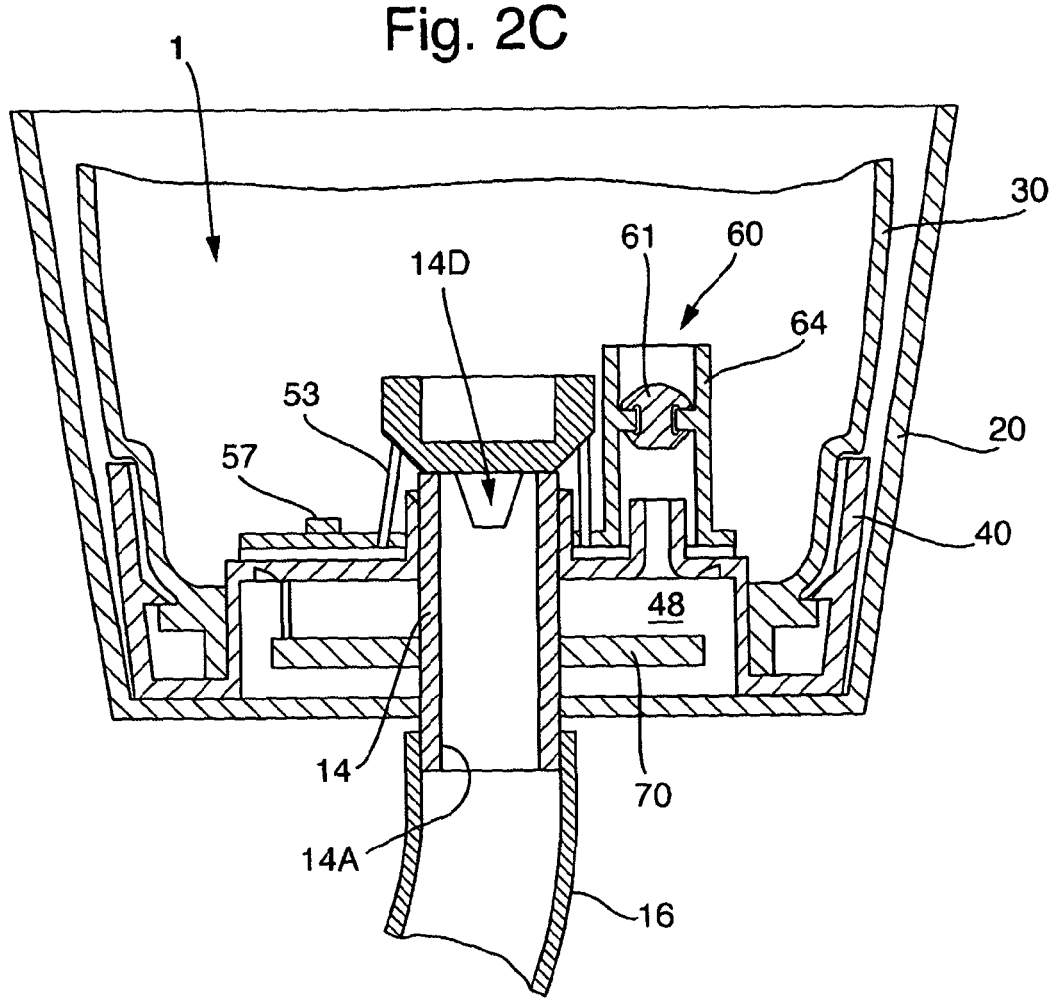

US 9,033,193 B2

CONTAINER WITH FRANGIBLE DEVICE INTERFACE

CROSS-REFERENCE TO RELATED APPLICATIONS

This application is a US National Stage of International Application No. PCT/GB2011/052045, filed 21 Oct. 2011, which claims the benefit of GB 1018058.6, filed 26 Oct. 2010, both herein fully incorporated by reference.

FIELD OF THE INVENTION

The present invention relates to a container with a frangible device interface. More particularly the present invention relates to a container with a frangible device interface which is adapted to be removably attached to a dispensing device in order to supply said device with a quantity of a liquid through a valve part of the frangible device interface. The frangible device interface is particularly adapted to be removable, but not replaceable, from the container.

BACKGROUND OF THE INVENTION

Hands free dispensing device, and refill units useful therewith are generally known to the art, and include those commonly assigned to the proprietor of the instant patent application. Such include the dispenser and refill unit disclosed in PCT/GB2009/002682; a relief valve and a cap assembly as disclosed in PCT/GB2009/002672, as well as the bottle with a tamper proof-cap as disclosed in PCT/GB2009/002678. The entire contents of these patent applications are herein incorporated by reference thereto.

Notwithstanding the benefits provided by the inventions disclosed in the foregoing applications, there is still a real and urgent need in the art for improved refill units, and caps for bottles which may be used to provide both the benefit of improved recyclability of the spent refill unit, and to improve the safety and efficacy of a dispensing device which is supplied by a refill unit such as described herein.

It is to such objects as well as further objects described below which are provided by the present invention.

BRIEF SUMMARY OF THE INVENTION

In a first aspect the present invention provides an improved cap for a bottle which comprises a frangible device interface including a valve part, which frangible device interface may be removed from the cap preferably after the contents of the bottle are substantially (>90% vol.) exhausted.

In a second aspect the invention provides a refill unit of the first aspect of the invention adapted for use with a dispensing device, preferably a hands-free dispensing device.

In a third aspect the invention provides an improved method for operating a dispensing device which includes the step of providing an improved cap according to the first aspect of the invention and/or a refill unit according to the second aspect of the invention, inserting the improved cap and/or refill unit into the dispensing device as appropriate, and operating the dispensing device wherein at the supply of a liquid composition is provided to the dispensing device through the valve part of the frangible device interface of the improved cap.

In a fourth aspect of the invention there is provided an improved method for improved recycling of a cap, or recycling of a refill unit comprising said cap, wherein the cap includes a frangible device interface including a valve when the method includes the step of manually removing or otherwise disassembling of the frangible device interface and the valve from the cap in order to separate it from the cap, and separately recycling the cap and/or refill unit comprising the cap separately from the frangible device interface. Optionally, following separation and removal of the frangible device interface a user may flush out the interior of the bottle such as with a quantity of water in order to clean any remaining liquid product from within the bottle and/or cap.

BRIEF DESCRIPTION OF THE FIGURES

Further features and aspects of the invention will be understood from a reading of the following specification, and in view for the consideration of the accompanying drawing figures. In the drawing figures, like elements present are indicated using the same reference numeral for consistency throughout the drawing figures.

FIGS. 2A, 2B and 2C illustrate a cross-sectional view of a frangible device interface including a valve, mounted on a bottle to form a refill unit, and a part of a dispensing device in (respectively) three relative positions, in FIG. 2A aligned but disengaged, in FIG. 2B aligned and partially engaged with the dispensing device, and in FIG. 2C aligned and fully engaged with the dispensing device.

DETAILED DESCRIPTION OF PREFERRED EMBODIMENTS

In a preferred embodiment, the present invention provides a cap which includes a frangible device interface which comprises a valve part, which cap is specifically designed for a bottle (or other container) which provides a quantity of a liquid (e.g., soap, personal care composition, topical composition, shampoo, surface treatment composition and the like) which is then dispensed by an automatic dispenser. Once the refill unit is empty, the frangible device interface is readily manually removed by a consumer in order to disassemble the valve part of the cap from the remaining body of the cap as well as from the bottle. The separation of the valve part of the cap from the remaining parts of the cap and bottle provides several benefits including: permitting for the total emptying of the bottle's contents; permitting for the entry of a stream or volume of water which may be used to flush out the interior of the bottle; as well as, physical separation of the valve part of the cap which may include a material which is difficult to recycle from the balance of the bottle and cap which, being preferably formed of recyclable thermoplastic polymers, may be more easily recycled. In preferred embodiments, once the frangible device interface of the cap is removed from the cap, it cannot thereafter be reinserted to or mated to the cap in order to form a liquid or gas seal with the cap. Such is advantageous as if the user could remove the cap and refill the bottle, there is a danger that they would fill the bottle with a product which was incompatible with the dispensing device, which could would damage the dispensing device.

The dispensing device may be one which is manually powered, e.g., a pump-type dispenser whereby a quantity of liquid is dispensed by manually operating the pump, viz., compressing it or squeezing it by hand.

Figure 1:
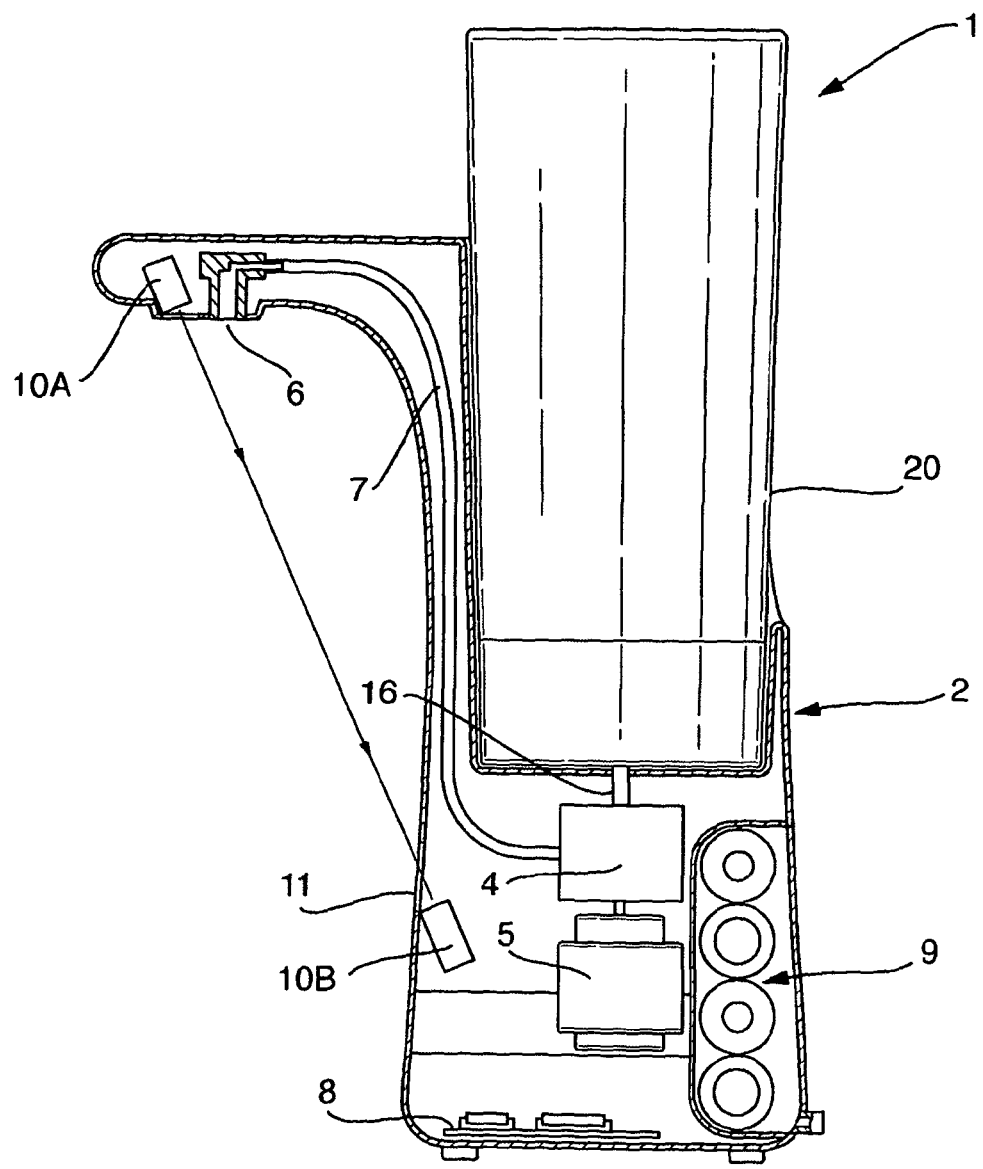
FIG. 1 illustrates a cross-sectional view of a hands-free dispensing device, and a refill unit mounted therein wherein the refill unit includes a cap having a frangible device interface including a valve as will be described in more clearly with reference to the following figures.

The dispensing device may also be a device which includes a motor driven pump, such as disclosed in PCT/GB2009/002682 the contents of which are herein incorporated by reference thereto. FIG. 1 illustrates a hands-free dispenser which is generally suitable for domestic use which includes the combination of a refill unit 1 with a base unit 2. The refill unit 1 provides a supply or a supply reservoir of a liquid or gel to be dispensed via the base unit 2. The refill unit 1 is removably insertable into the base unit 2 as described in more detail in the following figures. The base 2 has an interface 3 (not shown in FIG. 1) which is in fluid communication with a pump 4 driven by a motor 5, which pump is in turn in fluid communication with a dispensing nozzle 6 via an intermediate fluid tube 7. The pump 4 is selectively operable to pump a metered dose of the liquid or gel through fluid tube 7 and out the other end of the dispensing nozzle 6 in response to a suitable control or trigger signal. The base 2 further includes suitable controller logic circuitry 8 herein depicted as a printed circuit board having one or more solid-state components included thereon which operates as a controller means for the base 2, a power source, here depicted as an array of batteries 9, here four "AA" nominal 1.5 DC voltage batteries, and an infrared transmitter 10A which transmits an infrared beam (depicted) through a window 11 to an infrared receiver 10B noted to sense the presence of a user's hands in the vicinity of the base 2. The controller logic circuitry 8 is responsive to the signal from the infrared beam transmitter 10A and infrared receiver 10B to activate the pump. In the depicted embodiment, the illustrated infrared beam transmitter 10A and infrared receiver 10B are of the "break beam" type, however any known proximity sensor can be used. One such proximity sensor is a capacitance sensor, but others known to the art can be used in place of the beam transmitter 10A and infrared receiver 10B. Alternately a mechanical switch or other actuation means which requires physical contact with a user in order to activate the pump 4 in order to dispense a quantity of liquid or gel may be used in place of the proximity sensor wherein a hands-free mode of operation is unnecessary or not desired.

In FIG. 1, although an array of batteries 9 is illustrated, the base 9 can be supplied by any suitable power source, including but not limited to direct connection to a power supply to wall mains power, or via an intermediate voltage step down transformer or other power supply intermediate the base 2 and the wall mains power. The base 2 may also be supplied with rechargeable batteries. The operation of rechargeable batteries may be supplemented by or the batteries may be charged by a photovoltaic panel responsive to light and which generates a current.

Figure 2A:
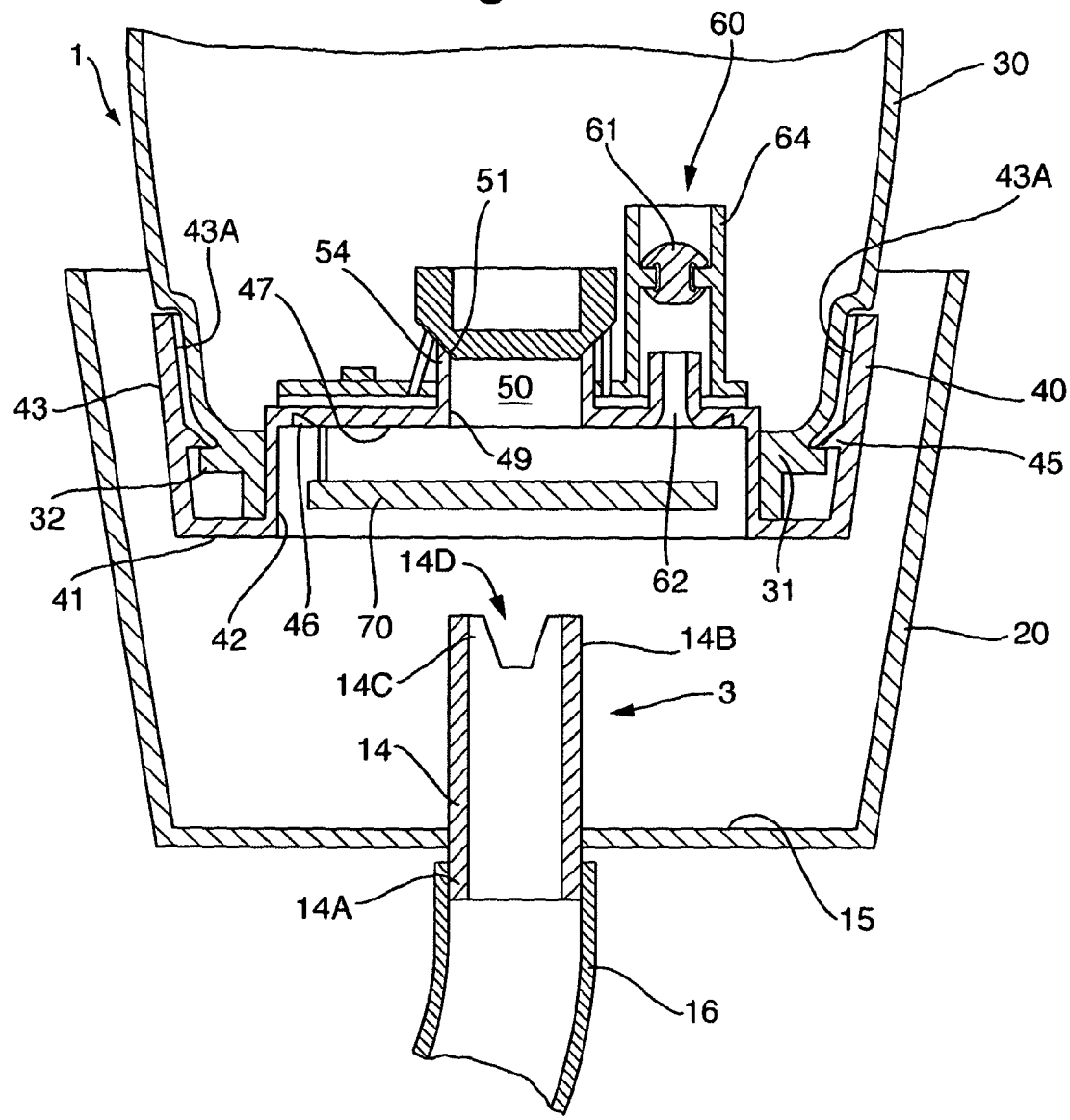
Figure 2B:
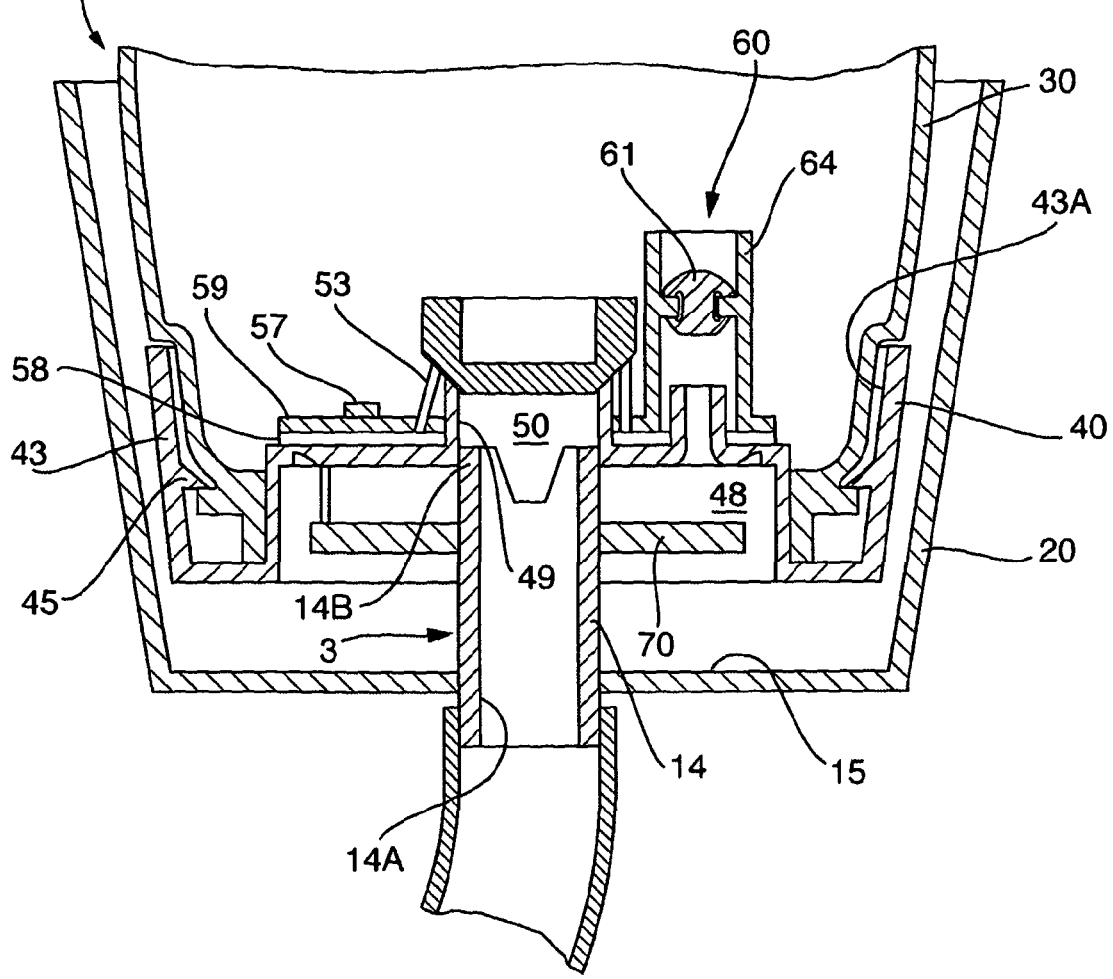

The interface between the cap 40 mounted on the base unit 2 is described with more particularly with reference to FIGS. 2A, 2B and 2C. Therein a receptacle part 20 of the base unit 2 is shown, and which is configured to form a cup-shaped housing surrounding at least a part of the cap 40 of the refill unit 1. A spigot 14 rises upwardly from a base 15 and passes therethrough with the distal end 14A of the spigot 14 in fluid communication via a transfer tube 16 with the pump. The spigot 14 projects upwardly from the base 15, and at its proximal end 14B includes one or more castellations 14C which define one or more fluid passages 14D between adjacent castellations 14C. The exterior of the spigot 14 includes a surrounding O-ring 17 beneath the castellations 14C which forms a liquid tight seal when the spigot 14 is engaged with part of the cap 40.

The cap 40 is mounted on the bottle 30 to form a refill unit 1. The bottle 30 has a neck 31 which fits over and seals to an annular sidewall 42 of the cap 40. The cap 40 has a cap face 41 extending between the annular sidewall 42, and an upwardly depending skirt 43 which defines the outer surface of the cap 40. Working inwardly from the skirt 43, the inner sidewall 43A of the skirt 43 includes retaining members 45 which cooperatively engage outwardly extending flanges 32 of the bottle 30 to provide further retention of the cap 40 on the bottle 30. The annular sidewall 42 extends inwardly into the interior of the cap 40 (and inwardly into the interior of the bottle 30) from the cap face 41 wherein it extends to a circular channel 46 which defines a frangible region of reduced thickness section of the material forming the cap the channel 46 being intermediate the annular sidewall 42 and the valve plate 47. Depending from the valve plate 47 is a tethered pull-ring 70 which is configured to be retained within the interior cavity 48 defined by the annular sidewall 42, the valve plate 47 and the cap face 41. As is also visible the valve plate 47 is recessed and spaced inwardly from the cap face 41. In the preferred embodiment shown, the tethered pull-ring 70 is recessed within the interior cavity 48, and is attached to the valve plate 47 at a point within the circular channel 45. The valve part of the cap 40 includes at least a liquid outlet leading from the interior of the bottle 30 and is formed as part of, or is mounted on the valve plate 47. The liquid outlet includes a valve plate 47, an annular wall 49 surrounding a central bore 50. At the top 54 of the annular wall 49 is a valve seat 51, here an inclined surface for an outlet valve element 52. As depicted herein the outlet valve element 52 is in the form of a U-shaped cup-like member but it may equally be any other shape, e.g., a solid member, a ball-shaped member, or a frustoconincal member or a cone. The outlet valve element 52 is biased into its closed position as depicted in FIGS. 2A and 2B by a plurality of biasing elements 53. These are attached at their upper ends towards the top of the outlet valve element 52 and are attached at their lower ends at a location radially outward of the annular wall 49 and below the top 54 of the annular wall 49. Preferably the biasing elements 53 are resilient members and are formed as part of the outlet valve element 52.

In addition to the valve part and the tethered pull-ring 70, the frangible device interface desirably further includes at least one pressure relief valve 60 which comprises at least an air inlet valve 61 in communication with the exterior of the cap 40 whereby air may be inlet into the interior of the bottle 30. While the pressure relief valve 60 is optional it is desirably present and is separate from the liquid outlet. In the embodiment depicted on FIGS. 2A, 2B and 2C the pressure relief valve 60 includes an air inlet bore 62 offset from the central bore 50 but similarly extending through the valve plate 47. The air inlet bore 62 is in fluid communication with an annular barrier column 64 which extends axially to a level axially above the level of the top 54 of the annular wall 49. Intermediate the ends of the air inlet bore 62 is a suitable air valve 61, here a conventional umbrella valve. The respective dimensions of the annular barrier column 64 and the central bore 50 are such that, when the pressure in the bottle 30 decreases when the liquid or gel is emptied from within the bottle, the pressure differential across the air valve 61 will become sufficient in order to allow air into the bottle 30. Any air entering via the air valve 61 also passes inwardly through the annular barrier column 64 which is above the level of the top of the annular wall 49, so that the air is not likely to become entrained in the outgoing liquid stream exiting the bottle via the cap 40. While a single pressure relief valve 60 is depicted, it is of course expected that a plurality of suitable pressure relief valves may be included in the cap 40, and preferably form part of the frangible device interface which is adapted to be removed from the cap 40 at an appropriate time. It is also expected that pressure relief valve(s) of a different configuration might also be used in conjunction with, or in place of the depicted pressure relief valve 60.

The cap 40 may include one or more fixing posts 57 extending from the valve plate 47 in the direction of the central bore 50. The outlet valve element 52 may be connected to a valve base 58 having a plurality of valve base perforations 58A as depicted on FIG. 3, via the intermediate connected biasing elements 53. The cap 40 may further include a fixing plate 59 which includes a plurality of fixing plate perforations 59A. The valve base perforations 58A and the fixing plate perforations 59A are suitable dimensioned to permit for the passage therethrough of the fixing posts 57, as can be more clearly understood from FIG. 3. As is visible from FIG. 3, the valve base 58 may be mounted on the valve plate 47 and thereafter the fixing plate 59 is mounted on the valve plate 47, with parts of the fixing posts 57 passing through both the valve base 58 and the fixing plate 59. While a friction fit of these elements is frequently suitable and sufficient, in some instances an intermediate adhesive may be used, or parts of the fixing posts may be suitably deformed such as by compression, via a snap-type fit, or via other physical deformation, or by thermally melting part of the fixing posts. The fixing posts 57 passing through both the valve base 58 and the fixing plate 59 also facilitate both the retention of and alignment of further parts of the cap 40, and in particular the valve part of the frangible device interface.

As noted previously, FIG. 2A provided an illustration of the refill unit 1, including the bottle 30 and cap 40 aligned but disengaged, with part of the base unit 2. Turning now to FIG. 2B there is now depicted the refill unit 1, including the bottle 30 and cap 40 aligned and partially engaged with the part of the base unit 2 wherein is illustrated the proximal end 14B of the spigot 14 engaged within the central bore 50 of the cap 40. The spigot 14 also extends through the tethered pull-ring 70.

Finally turning to FIG. 2C there is depicted the refill unit 1 aligned and fully engaged (mounted upon, installed within) with the dispensing device. As seen thereon, the bottle 30 and cap 40 are fully engaged with the part of the base unit 2. The proximal end 14B of the spigot 14 has caused the outlet valve element 52 to be displaced away from the valve seat 51 and causing it to rest upon the proximal end 14B of the spigot 14, which includes one or more castellations 14C which define one or more fluid passages 14D between adjacent castellations 14C. The liquid contained within the bottle 30 now passes via the fluid passages 14D inwardly into the interior of the spigot 14, wherein it passes to the transfer tube 16. When a sufficient pressure differential between the interior of the bottle 30 and the ambient environment exists, the pressure relief valve 60 operates to admit air present within the interior cavity 48 into the interior of the refill unit 1, viz. the bottle 30.

While not show in the figures, when the refill unit 1 is withdrawn from the base unit 2, the spigot 14 is disengaged and the bias of the plurality of biasing elements 53 attached at their upper ends towards the top of the outlet valve element 52 operate to urge the outlet valve element 52 to be seated upon the valve seat 51, thereby denying further exit of the liquid contained within the bottle 30 through the open bore 50.

The bottle 30 is a generally rigid plastic container containing liquid soap and the like. As can be understood from the figures, according to the preferred embodiment shown in the figures, the bottle 1 is generally elliptical in cross-section. It may also be used to dispense other liquid or semi-liquid products (ideally with a viscosity greater than water), for use in personal care, e.g., topically applied compositions such as hand cream, body lotion, moisturizer, face cream, shampoo, shower gel, foaming hand wash, shaving cream, washing-up liquid, toothpaste, a sanitizing composition agent such as alcohol gel or other topically applied sanitizing composition. The bottle may also be used to dispense other surface treatment compositions, (e.g., hard surface, soft surface) either directly to a locus to be treated, but preferentially onto a carrier material or substrate, such as a person's hand, a sponge, a brush, a wipe article, a disposable wipe article (napkin, tissue, paper towel, etc.) and the like. By way of non-limiting example such surface treatment compositions include those for the treatment of inanimate or non-porous hard surfaces, such as can be encountered in a kitchen or bath, dishware, tableware, pots, pans, textiles including garments, textiles, carpets, and the like. In the preferred embodiment shown, the bottle is specifically designed to be used in an inverted configuration on an automatic dispenser, as depicted in FIG. 1, but such is to be understood as a non-limiting illustration of one aspect of the invention.

Figure 3:
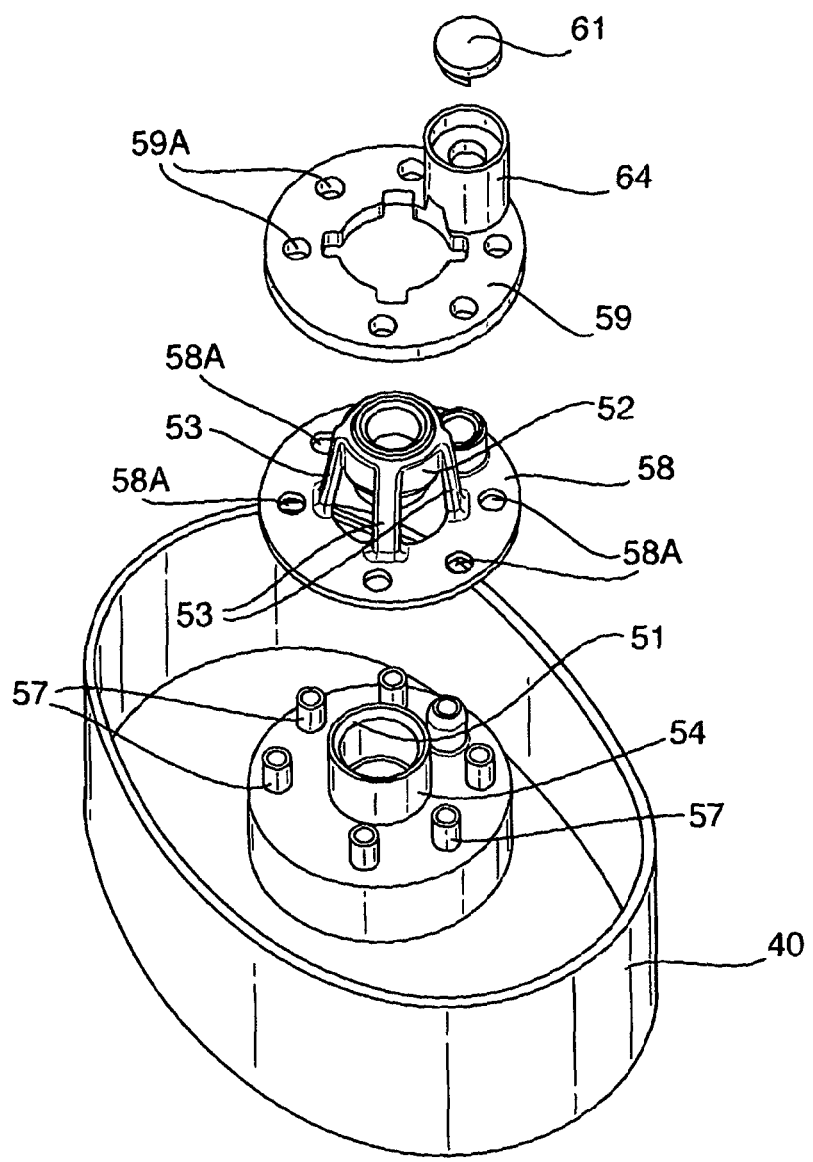
FIG. 3 illustrates in a perspective "exploded" view of the elements of the cap.

FIG. 3 illustrates in a perspective "exploded" view the elements of the cap 40 of the invention which had been described in the prior figures.

Figure 4:
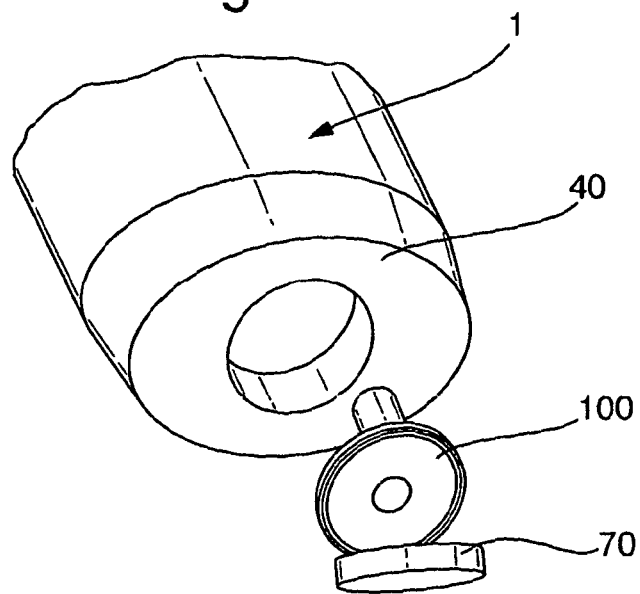
FIGS. 4 and 5 respectively illustrate a front perspective view and a side perspective view of a frangible device interface including a valve disengaged from and separated from a cap.
Figure 5:
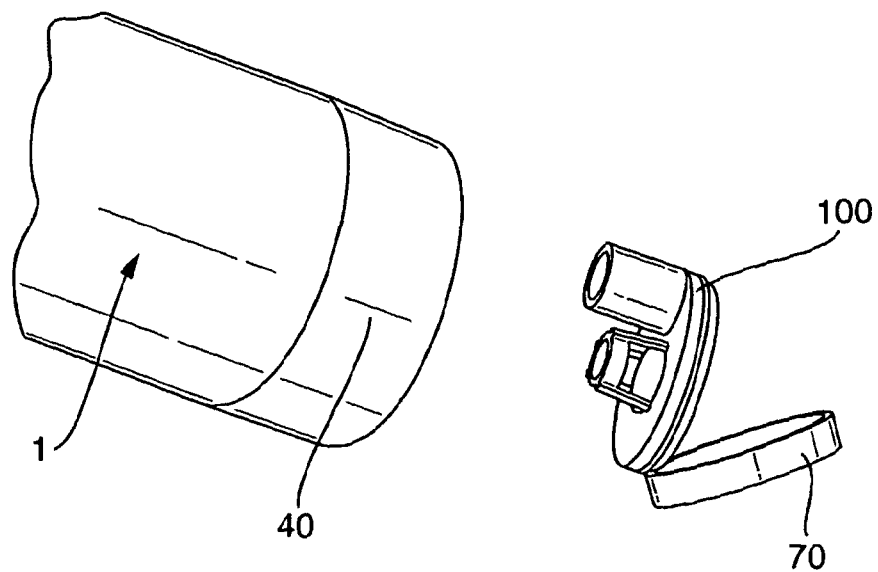

FIGS. 4 and 5 respectively illustrate a front perspective view and a side perspective view of a frangible device interface including a valve disengaged from and a separated from a cap 40 of the invention. As is visible from the figures, the frangible device interface 100 is separated from the remainder of the cap 40, and in this embodiment the frangible device interface 100 includes a valve part, here the outlet valve element 52 seated on the valve seat 51 of the annular wall 49, the valve plate within the confines of the circular channel 46 and the tethered pull-ring 70 attached to the valve plate 47. The frangible device interface 100 further includes the optional pressure relief valve 60, as is shown.

The frangible device interface 100 is easily manually removed from the cap 40 by grasping or pulling on the pull-ring 70 which causes the reduced thickness section of the cap 40 in the region of the channel 46 to be breached, allowing for the separation of and withdrawal of the frangible device interface 100 from the cap 40. Optionally, following separation and removal of the frangible device interface 100 a user may flush out the interior of the bottle 30 such as with a quantity of water in order to clean any remaining liquid product from within the refill unit 1.

In an alternative embodiment of the invention, the channel 46 is replaced by an O-ring sealing member, which permits for the reassembly of the frangible device interface 100 into the cap 40, which permits for the bottle 30 to be refilled with an appropriate liquid product, and be reused.

In an alternative embodiment of the invention the tethered pull ring may be substituted by an element having an geometry other than a ring shape.

The invention claimed is:

1. A cap for a bottle which includes a frangible device interface comprising a valve part;
   wherein the bottle contains a liquid or gel product and has a neck upon which is mounted the cap, the cap comprising an interior cavity defined by an annular sidewall, a valve plate, and a cap face;
   wherein the valve plate includes a liquid outlet leading from the interior of the bottle into the interior cavity, the liquid outlet having an annular wall surrounding a central bore, an outlet valve element, and further depending from the valve plate is a tethered pull-ring which is recessed within the interior cavity, wherein the valve plate further includes a pressure relief valve; and wherein the cap further includes a channel intermediate the annular sidewall and the valve plate and which defines a frangible region of reduced thickness in the material forming the cap.

2. The cap for a bottle according to claim 1, wherein the outlet valve element is biased against onto the annular wall by one or more biasing elements.

3. A dispenser for dispensing liquid or gel product, the dispenser including a refill unit containing a quantity of the product to be dispensed, and a base unit through which the product is dispensed, wherein the base unit includes a receptacle part, configured to form a housing for receiving a part of a refill unit which comprises a cap according to claim 1 mounted on a bottle containing the liquid product, the receptacle part including a base and an upwardly projecting spigot which at a proximate end thereof includes one or more castellations and one or more passages, wherein the spigot is engaged within the central bore of the outlet and displaces the outlet valve element away from the valve seat.

4. The cap for a bottle according to claim 1, wherein the cap includes a frangible device interface including a valve which is capable of being manually removed or otherwise disassembled from the cap in order to separate it from the cap, and wherein the cap is capable of being separately recycled from the frangible device interface.

5. A refill unit comprising a cap according to claim 1, wherein the cap includes a frangible device interface including a valve which is capable of being manually removed or otherwise disassembled from the cap in order to separate it from the cap, and wherein the refill unit comprising the cap is capable of being separately recycled from the frangible device interface.

* * * * *